United States Patent
Smith

(10) Patent No.: US 9,640,013 B2
(45) Date of Patent: May 2, 2017

(54) TIERED RADIO FREQUENCY IDENTIFICATION

(75) Inventor: John Stephen Smith, San Jose, CA (US)

(73) Assignee: Ruizhang Technology Limited Company, Shanghai (CN)

( * ) Notice: Subject to any disclaimer, the term of this patent is extended or adjusted under 35 U.S.C. 154(b) by 1370 days.

(21) Appl. No.: 12/028,722

(22) Filed: Feb. 8, 2008

(65) Prior Publication Data

US 2008/0211637 A1    Sep. 4, 2008

Related U.S. Application Data

(60) Provisional application No. 60/904,590, filed on Mar. 2, 2007.

(51) Int. Cl.
| | |
|---|---|
| *G07F 7/10* | (2006.01) |
| *G06Q 20/32* | (2012.01) |
| *G06Q 20/34* | (2012.01) |
| *G06Q 20/40* | (2012.01) |
| *G07G 1/00* | (2006.01) |

(52) U.S. Cl.
CPC ....... *G07F 7/1008* (2013.01); *G06Q 20/3278* (2013.01); *G06Q 20/341* (2013.01); *G06Q 20/3576* (2013.01); *G06Q 20/40975* (2013.01); *G07G 1/009* (2013.01)

(58) Field of Classification Search
CPC .... G06Q 10/08; G06Q 10/087; H04L 25/062; H04L 25/063; H04L 25/064; G06K 7/0008; G06K 19/0723; G06K 19/07749

USPC ..... 340/1.1, 10.1, 10.4, 10.41, 10.42, 10.52, 340/572.3
See application file for complete search history.

(56) References Cited

U.S. PATENT DOCUMENTS

| | | |
|---|---|---|
| 5,406,570 A | 4/1995 | Berrou et al. |
| 6,864,570 B2 | 3/2005 | Smith |
| 6,933,848 B1 | 8/2005 | Stewart et al. |

(Continued)

OTHER PUBLICATIONS

ABA: *"Public Key Cryptography for the Financial Services Industry: Key Agreement and Key Transport Using Elliptic Curve Cryptography"* Working Draft, American National Standard, X9.63-199x, Jan. 8, 1999, pp. I-124.

(Continued)

*Primary Examiner* — An T Nguyen
(74) *Attorney, Agent, or Firm* — Blakely, Sokoloff, Taylor & Zafman LLP

(57) ABSTRACT

Methods and apparatuses for tiered RFID communication are provided, inter alia, for privacy and security in at least certain embodiments. An RFID tag includes first and second memory locations respectively storing first and second identifiers. The tag is configured to respond to an identification query with the first identifier until receipt of a command code. After receipt of the command code, the tag is configured to respond to the identification query with the second identifier. The first identifier can be permanently disabled for privacy. In a one embodiment, the first identifier is an electronic product code, and the second identifier is a recycling identifier, hazardous waste information, or regulatory disposal requirement. In another embodiment, the first and second identifiers can identify the tag's associated item with differing levels of specificity for improved security.

34 Claims, 9 Drawing Sheets

(56) References Cited

U.S. PATENT DOCUMENTS

| | | | |
|---|---|---|---|
| 6,942,155 | B1 | 9/2005 | Stewart et al. |
| 7,116,240 | B2 | 10/2006 | Hyde |
| 7,411,503 | B2* | 8/2008 | Stewart et al. ............ 340/572.1 |
| 7,450,010 | B1* | 11/2008 | Gravelle et al. ........... 340/572.1 |
| 7,737,825 | B1* | 6/2010 | Stewart et al. ............. 340/10.5 |
| 8,237,569 | B2* | 8/2012 | Arai et al. ................. 340/572.7 |
| 2004/0263319 | A1* | 12/2004 | Huomo ....................... 340/10.2 |
| 2005/0116826 | A1* | 6/2005 | Wertsebrger .............. 340/572.3 |
| 2005/0206552 | A1* | 9/2005 | Friedrich ........................ 342/42 |
| 2005/0226489 | A1* | 10/2005 | Beach et al. ................. 382/141 |
| 2006/0273883 | A1* | 12/2006 | Pillai et al. ................ 340/10.42 |
| 2006/0289646 | A1* | 12/2006 | Shafer .......................... 235/451 |
| 2007/0008070 | A1* | 1/2007 | Friedrich .................... 340/10.1 |
| 2007/0176756 | A1* | 8/2007 | Friedrich .................. 340/10.51 |
| 2008/0061124 | A1* | 3/2008 | Langlois et al. .............. 235/376 |
| 2008/0061941 | A1* | 3/2008 | Fischer et al. .............. 340/10.1 |

OTHER PUBLICATIONS

Certicom, *"The Elliptic Curve Cryptosystem: Remarks on the Security of the Elliptic Curve Cryptosystem"* A Certicom Whitepaper, Sep. 1997, pp. 1-124.

Diffie, et al. *"New Directions in Cryptography"* IEEE Transactions on Information Theory, vol. IT-22, No. 6. Nov. 1976, pp. 644-654.

EPCglobal's *"Specification for RFID Air Interface"* EPC Radio-Frequency Identity Protocols, Class 1 Generation-2 UHF RFID Protocol for Communications at 860 MHz to 960 MHz, Version 1.0.9. Jan. 31, 2005, p. 1-94.

Koblitz, Neil *"An Elliptic Curve Implementation of the Finite Field Digital Signature Algorithm"* 1998, Springer-Verlag Berline Heidelberg, LNCS 1492, pp. 327-337.

Koblitz, Neil *"Elliptic Curve Cryptosystems"* Mathematics of Computation, Jan. 1987, pp. 203-209, vol. 48, No. 177. (Abstract).

U.S. Appl. No. 11/546,683, Eric J. Snyder.

* cited by examiner

Redemption Information

| Bits | Description |
|---|---|
| 000 | none |
| 001 | California Redemption Value - $0.05 |
| 010 | California Electronic Waste Recycle Fee |
| 011 | Maine Bottle Bill Value |
| 100 | Maine Recycling Assistance Fee |
| 101 | Arkansas Beverage Container Litter Reduction Fee |
| 111 | Connecticut Bottle Bill Value |

Regulatory Information

| Bits | Description |
|---|---|
| 000 | none |
| 001 | EU Directive 2002/95/EC "ROHS Directive" |
| 010 | EU Directive 2002/96/EC "WEEE Directive" |
| 011 | US Export Controlled |
| 100 | Custom Program - NAFTA |
| 101 | Custom Program – EU-Mexico FTA |
| 111 | Lome Convention |

Hazardous Waste Information

| Bits | Description |
|---|---|
| 0000 | no hazardous chemicals |
| 0001 | arsenic |
| 0010 | asbestos |
| 0011 | benzene |
| 0100 | beryllium |
| 0101 | carbon tetrachloride |
| 0110 | cyanide |
| 0111 | lead or lead compounds |
| 1000 | cadmium or cadmium compounds |
| 1001 | hexavalent chromium |
| 1010 | mercury or mercury compounds |
| 1011 | trichloroethylene |
| 1100 | tetrachloroethylene |
| 1101 | methyl chloroform, polychlorinated biphenyls (PCB) |
| 1110 | polybrominated biphenyls (PBB |
| 1111 | polybrominated diphenyl ethers (PBDE) |

FIG. 3C

TIERED RADIO FREQUENCY IDENTIFICATION

RELATED APPLICATION

This application claims benefit and priority to provisional application 60/904,590 filed on Mar. 2, 2007. The full disclosure of the provisional application is incorporated herein in its entirety by reference.

FIELD OF THE TECHNOLOGY

The present invention generally relates to the field of radio frequency identification (RFID) devices, and particularly to RFID devices and methods for using and making same.

BACKGROUND

Goods and other items may be tracked and identified using an RFID system. An RFID system includes at least one tag and a reader. The tag is a small transponder typically placed on an item to be tracked. The reader, sometimes referred to as an interrogator, includes a transceiver (alternatively, separate transmitter and receiver) and one or more antennas. The antennas emit electromagnetic (EM) waves generated by the transceiver, which, when received by tag, activates the tag. Once the tag activates, it communicates using radio waves back to the reader, thereby identifying the item to which it is attached.

There are three basic types of RFID tags. A beam-powered tag is a passive device which receives energy required for operation from EM waves generated by the reader. The beam powered tag rectifies an EM field and creates a change in reflectivity of the field which is reflected to and read by the reader. This is commonly referred to as continuous wave backscattering. A battery-powered semi-passive tag also receives and reflects EM waves from the reader; however a battery powers the tag independent of receiving power from the reader. An active tag, having an independent power supply, actively transmits EM waves which are then received by the reader.

Communication between the tag and reader is defined by an air interface communication protocol. For example, RFID tags can be implemented using (i) EPCglobal's Class 1 Generation 2 UHF Air Interface Protocol Standard Version 1.0.9: ("Gen 2"); or (ii) ISO/IEC 18000-6:2004 Information technology—Radio frequency identification for item management—Part 6: Parameters for air interface communications at 860 MHz to 960 MHz (type A, B, or C devices). These protocols are incorporated by reference herein.

However, the above protocols may not adequately address privacy and security concerns for certain RFID applications. For privacy, an RFID tag can be permanently disabled as described as one embodiment in U.S. Pat. No. 6,933,848, entitled "System and Method for Disabling Data on Radio Frequency Identification Tags," assigned to Alien Technology Corporation, which is incorporated by reference herein. All of the efficiencies provided by RFID technology are lost with a permanently disabled tag. It would be advantageous for a tag to provide privacy, and yet continue to provide useful information (such as, a recycling identifier, hazardous waste information, or regulatory disposal requirements).

For security, a conventional tag can be locked, whereby individual memory banks cannot be read directly. In the supply chain, it may be prudent in some circumstances for a tag not to identify its associated item. For example, if the tag identifies a controlled pharmaceutical substance, one may want to conceal this fact during transport in the supply chain. But, if the tag's electronic product code (EPC) is inaccessible, the efficiencies provided by RFID technology are lost. A tag that affords security and continues to supply useful information (such as, a less specific EPC) is highly desirable.

The above protocols provide for reprogramming a tag with a new ID ("identifier"), however reprogramming a tag requires that the information to be programmed be available at the point where the ID is changed, and may require that many bits are programmed at the tag. For example, if it is desirable to replace an EPC with a recycle code, the best party to determine the proper recycle code may be the party that originally commissioned the tag, (programming it with its primary ID) rather than the retailer, consumer or other party who would decommission the tag from the supply chain and convert the tag into a recycle tag. If the recycle code or other recycle code is available in another memory segment of the tag, preexisting protocols would require that it be read out of the tag and then programmed into the ID memory of the tag, requiring multiple commands and taking substantial time.

From the above, it is seen that methods and apparatuses for "tiered" RFID devices having identifiers arranged in layers of an operating procedure, as described below, can provide many benefits.

SUMMARY OF THE DESCRIPTION

Methods and apparatuses for tiered RFID communication are provided for privacy and security. An RFID tag includes first and second memory locations respectively storing first and second identifiers. The tag is configured to respond to an identification query with the first identifier until receipt of a command code. After receipt of the command code, the tag is configured to respond to the identification query with the second identifier.

In a one embodiment, the first identifier is an electronic product code, and the second identifier is a recycling identifier, hazardous waste information, or regulatory disposal requirement for the item associated with the tag. This is also useful for end-of life disposal of battery tags themselves. The first identifier can be permanently disabled or erased for privacy. The first and second identifiers can also identify the tag's associated item with differing levels of specificity for improved security.

In another embodiment of the present invention, a method of operating an RFID reader includes transmitting a first query to a tag and receiving a first identifier. The reader transmits a command sequence to the tag specifying that it is to change its ID to an alternative ID stored in the tag. If any reader transmits a query at anytime after the command sequence, it will receive a second identifier in response from such tag.

In yet another embodiment of the present invention, a method for operating a tag includes receiving an interrogating RF signal. The interrogating RF signal provides power to the tag. After an arbitration sequence, the tag returns a first identifier to the reader. The tag receives a reveal code, or a conceal code, from the interrogator. The tag compares the reveal code from the interrogator to a code determined by, or alternatively stored on, the tag. If the comparing results in a successful match, the tag transmits a second identifier in response to any received identification query. If the comparing results in an unsuccessful match, the tag creates a persistent timeout interval, which prevents further attempts.

In yet another embodiment of the present invention, a method for operating a tag includes receiving an interrogating RF signal. After an arbitration sequence, the tag returns a first identifier to the reader. The tag receives a "kill" or "access" or similar code or command sequence (e.g., any command permitted by an RFID air-interface protocol or the like) from the interrogator using the same sequence of commands that conventional tags use for killing, accessing security functions, or other functions on those tags. The tag compares one or more codes received from the interrogator to one or more codes determined by, or alternatively stored on, the tag for this special purpose. If the comparing results in a successful match, rather than "killing" or going into the "access" mode, the tag transmits a second identifier in response, or alternatively changes permanently to a secondary ID and responds to further queries with the secondary ID. If the comparing results in an unsuccessful match, the tag responds in the same fashion as a conventional tag (e.g. by product an EPC). In a specific embodiment for enhanced security, one may not distinguish operation of a tag according to this invention to a conventional tag until receipt of a valid code and/or command sequence. The invention can be applied as a hidden custom feature operating consistent with a conventional protocol. It should be understood that to ensure complete anonymity of a disguised tag among conventional tags, the disguised tag should avoid inconsistent power usage as compared to conventional tags. In other words, in one embodiment, a disguised tag may use power only as expected with conventional tags, at least until the disguised tag receives a valid code and/or command sequence.

Various additional objects, features, and advantages of the present invention can be more fully appreciated with reference to the detailed description and accompanying drawings that follow.

BRIEF DESCRIPTION OF THE DRAWINGS

The present invention is illustrated by way of example and not limitation in the figures of the accompanying drawings in which like references indicate similar elements.

FIGS. 3B-C show a simple example of tag memory that can be used in this or other embodiments of the present invention.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Figure 1:
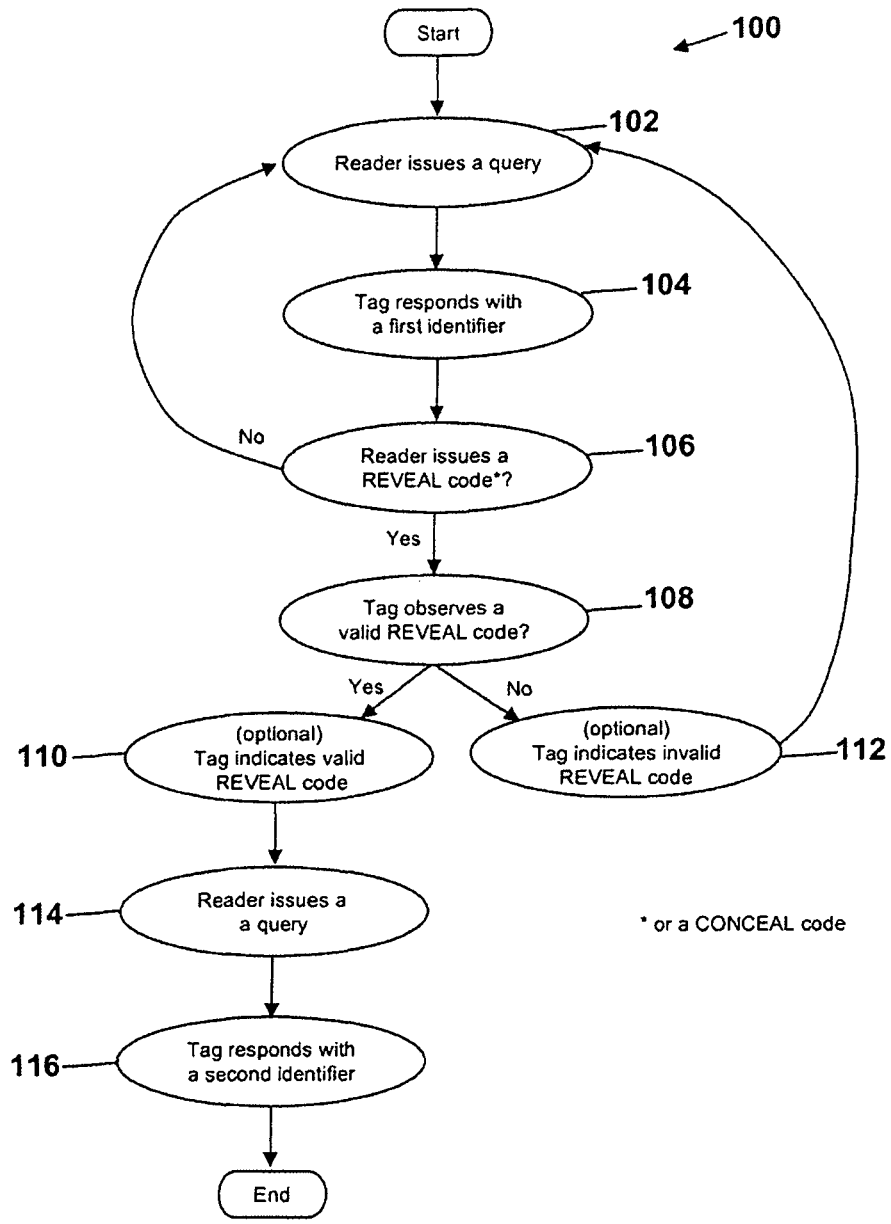
FIG. 1 illustrates a simplified flow diagram for a method according to an embodiment of the present invention.

FIG. 1 illustrates a simplified flow diagram of a method 100 for tiered RFID according to an embodiment of the present invention. In operation 102, a reader issues a query to command a tag to respond with its identifier along with any other information required by the air interface protocol (e.g., EPC, handle, cyclic redundancy check (CRC)). In response to the query, the tag responds in operation 104 with a first identifier. A reader query can include a bit pointer and mask to sub-select tags in a population matching the mask. In that case, matching tags may reply in operation 104 with a truncated response beginning with bit(s) of the first identifier that follow the mask.

Next, in operation 106, a reader issues a REVEAL code to the tag. The REVEAL code instructs the tag to respond to queries with a second identifier in lieu of the first identifier. The second identifier, in this embodiment, provides increased product specificity over the first identifier. For example, the first identifier can simply indicate the item is an analgesic product, while the second identifier can indicate a particular morphine product. It should be noted that throughout this specification, a REVEAL code can be interchangeable with a CONCEAL code. The CONCEAL code instructs the tag to respond to queries with a less specific second identifier instead of the first identifier.

The REVEAL code (or CONCEAL code) can be specified by a user, factory pre-programmed (randomly or deterministically at factory), or calculated by an algorithm. The reader may also transmit a CRC along with the REVEAL code for one or multiple bit error detection. For example, the CRC can be 8, 16, 32, 64 bits long or more. The authentication process may use public-key cryptography or elliptic curve algorithms for key exchange or the like. Additional details of cryptography and elliptic curve algorithms are provided by (i) Neal Koblitz, An Elliptic Curve Implementation of the Finite Field Digital Signature Algorithm, 1998, Springer-Verlag Berlin Heidelberg, LNCS 1462, pp. 327-337; (ii) Diffie-Hellman, New Directions in Cryptography, November 1976, IEEE Transactions on Information Theory, pp. 644-654; (iii) "Public Key Cryptography for the Financial Services Industry: Elliptic Curve Key Agreement and Transport Protocols," ANSI X9.63, Oct. 5, 1997, pp. 45-47; (iv) Koblitz, Neal, "Elliptic Curve Cryptosystems," Mathematics of Computation, January 1987, pp. 203-209, vol. 48, No. 177, each of which is incorporated by reference herein. Embodiments of the present invention can use implement one or more error detection and/or correction techniques, such as odd or even parity check, low-density parity-check code, turbo codes (as described in U.S. Pat. No. 5,406,570, which is incorporated by reference), or block codes and convolutional codes (e.g., Reed-Solomon error correction block codes, Viterbi-decoded short constraint length convolutional codes, or the like).

A REVEAL code calculated by an algorithm can be the result of a Boolean function (AND, OR, NOT, XOR, NOR, or combinations thereof) of a predetermined sequence and a tag handle. For example, the REVEAL code can be the XOR of the predetermine sequence and tag handle. The tag handle is a pseudorandom number generated by a tag and transmitted to the reader, whereby the reader can use the handle to provisionally identify such tag. If the range of allowed handles is sufficiently large in comparison to an expected tag population (e.g., 16, 32 or more bit handle), the handle is likely to uniquely identify the tag. If additional security is warranted, the REVEAL code can be implemented as two or more codes in a multi-operational procedure. For example, the REVEAL code can comprise of both (i) an XOR of a first predetermined sequence and a first handle and (ii) a multiplicative product of a second predetermined sequence and a second handle, wherein each of (i) and (ii) are transmitted separately to the tag. The first and second predetermined sequences and handles can be the same in certain embodiments.

Referring to FIG. 1, the tag may observe a REVEAL code in operation 108 transmitted by the reader. The tag verifies that the REVEAL code is valid by comparing the observed REVEAL code to a REVEAL code stored on the tag. For security and privacy, the REVEAL code stored on the tag is permanently locked and inaccessible, or at least password protected after initial commission of the tag. The tag's verification can include, among other things, (i) matching the codes, (ii) algorithmic operations prior to the matching codes, (iii) calculating a CRC for a code and comparing to a received CRC and (iv) combinations thereof.

In respective operations 110 and 112, the tag can indicate receipt of a valid or invalid REVEAL code to the reader. Tag confirmation, for purposes of this specification, can be transmission of the REVEAL code, handle, pre-programmed code, or other sequence to the reader. If the reader does not receive a valid tag confirmation, it can re-transmit the REVEAL code. In a specific embodiment, a second attempt to process a REVEAL code can be subject to a persistent timeout interval as more fully described below. In operations 114 and 116, assuming a valid REVEAL code is verified by the tag, a reader may issue a query and the tag will respond with a second identifier.

In respective operations 110 and 112, the tag may emulate a command sequence which is available on conventional tags under a particular protocol, and may not indicate receipt of a valid or invalid "reveal" command sequence to the reader (or simply respond in a manner consistent with the particular protocol). For example, the invention can be a hidden custom feature providing anonymity of a disguised tag operating according the present invention. In operations 114 and 116, assuming a valid command sequence or key exchange is verified by the tag, a reader may issue a query and the tag will respond with a second identifier.

Figure 2:
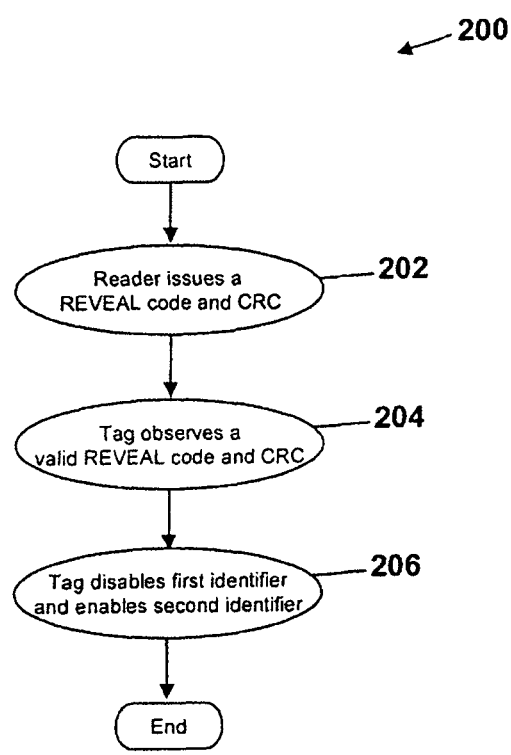
FIG. 2 illustrates another simplified flow diagram for a method according to an embodiment of the present invention.

FIG. 2 illustrates another simplified flow diagram for a method 200 of tiered RFID according to an embodiment of the present invention. In operation 202, a reader issues a REVEAL code and CRC therefor. This can be done at a consumer point of sale (e.g., cash register, check-out line, self check-out station, in-store kiosk, automated teller machine, or the like) during a purchase of an item associated with a tag. The tag next observes a valid REVEAL code and CRC in operation 204. Responsive to a valid REVEAL code, the tag disables a first identifier and enables a second identifier in operation 206. Operation 206 can be accomplished using many techniques that will be clear to one skilled in the art based on the teachings contained this specification. One example would be to overwrite a specific memory location storing the first identifier with the second identifier.

An alternative implementation of operation 206 is to redirect a memory pointer from a first memory location to a second memory location storing the respective identifiers. If a memory pointer is redirected, the first memory location can still be overwritten to make the first identifier permanently irrecoverable. However, certain RFID application may require their first and second identifiers be reused depending on the context. For example, a tag may respond to queries with a first identifier outside a controlled area (such as a hospital, pharmacy, clinic, and the like) and respond with a second identifier inside the controlled area. This is particularly advantageous if the tagged item is repeatedly moved between controlled and non-controlled areas.

Another alternative implementation of operation 206 is to set a flag at the tag. The flag can be used by the logic of the tag to determine which information is to be replied as the ID during an inventory. The setting of the flag may also make the original ID of the tag inaccessible, or the tag may erase the original ID, either immediately or at a later opportunity.

Method 200 may also include a persistent timeout interval (not shown in FIG. 2) for additional security. The persistent timeout interval prevents a rapid succession of attempts to "crack" the REVEAL code. If the timeout period is sufficiently long, it may take hours, days, weeks, or years to attempt all permutations of the REVEAL code, thus preserving privacy and/or security. Techniques for persistent data for passive tags are described in U.S. Pat. No. 6,942,155 (assigned to Alien Technology) and U.S. Pat. No. 7,116,240 (apparently assigned to Impinj, Inc.), both are incorporated by reference herein.

Figure 3A:
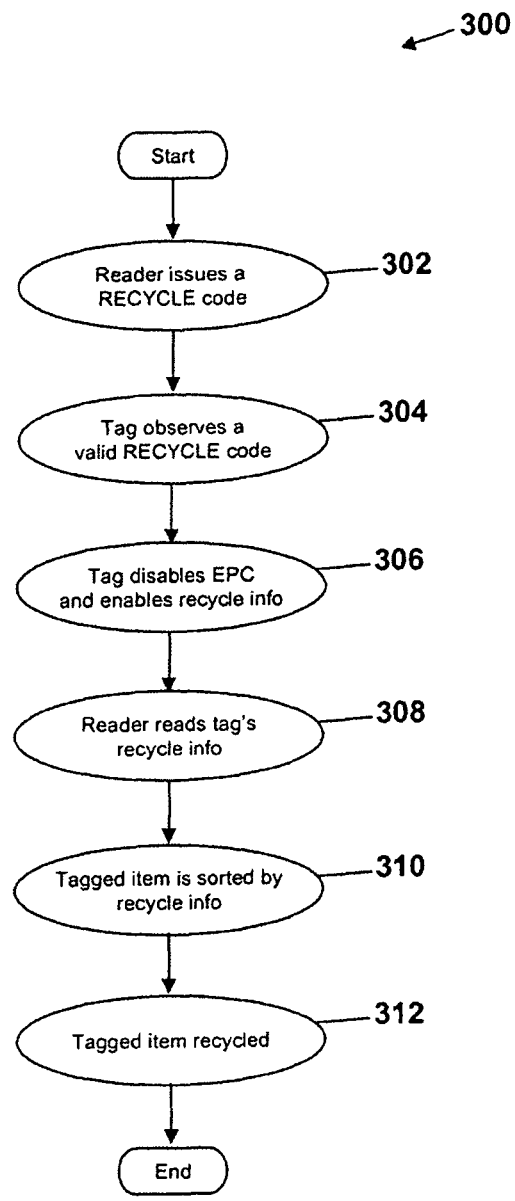
FIG. 3A illustrates a simplified flow diagram for a method according to an embodiment of the present invention.
Figure 3B:
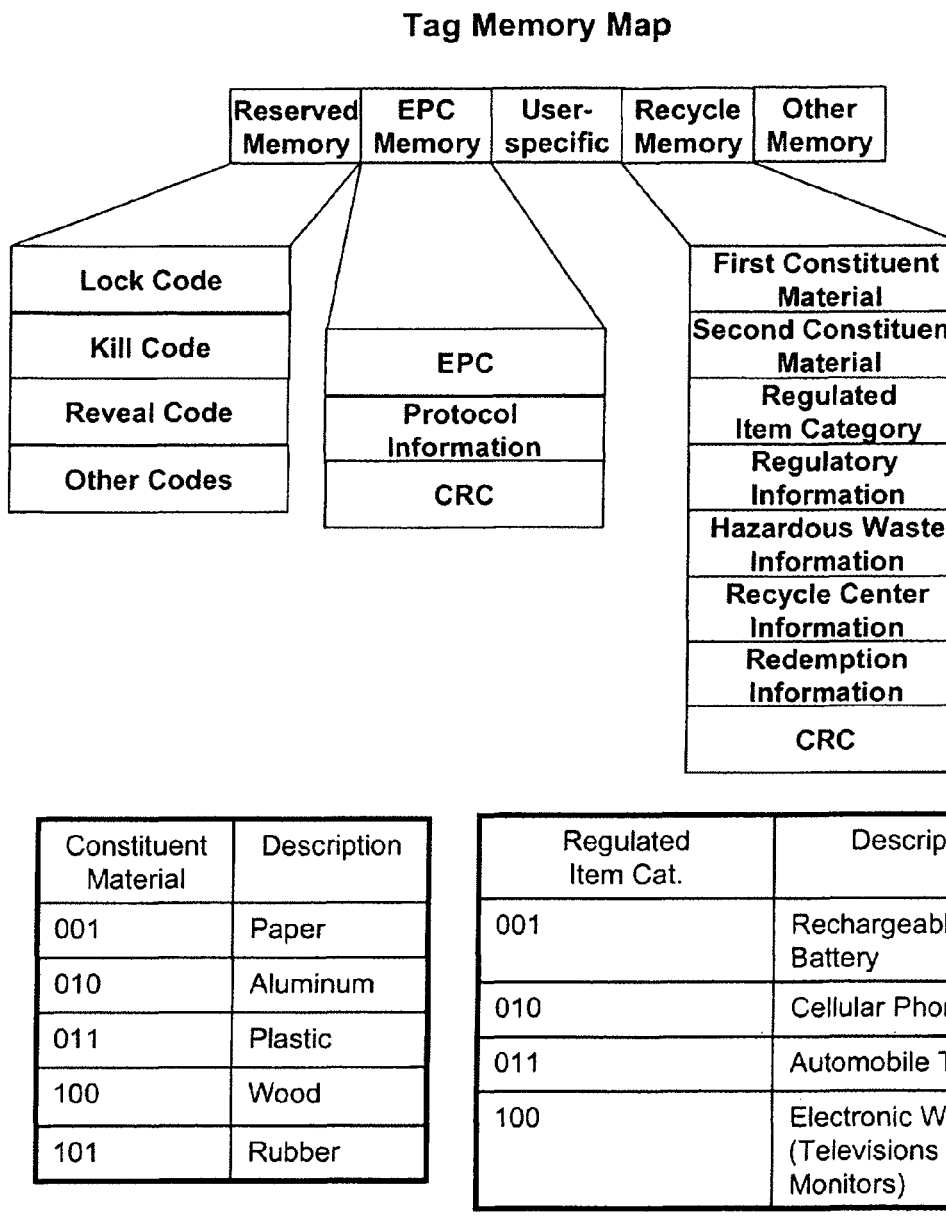

FIG. 3A illustrates a simplified method 300 according to an embodiment of the present invention. A reader issues and tag receives a valid RECYCLE code in operations 302 and 304. Responsive to the RECYCLE code in operation 306, the tag disables its EPC and enables access to recycle information. Recycle information can include, without limitation, constituent materials of the item, hazardous waste information, regulatory requirements, recycling center information, redemption value of the item (e.g., beverage containers). A reader, not necessarily the reader that transmitted the REVEAL code, can read the tag's recycle information in operation 308. The tagged item can then be automatically sorted in operation 310 based on the recycle information stored on the revealed tag, and finally disposed or recycled in the appropriate manner in operation 312. FIGS. 3B-C show a simple example of tag memory that can be used in method 300 or other embodiments of the invention.

Figure 4:
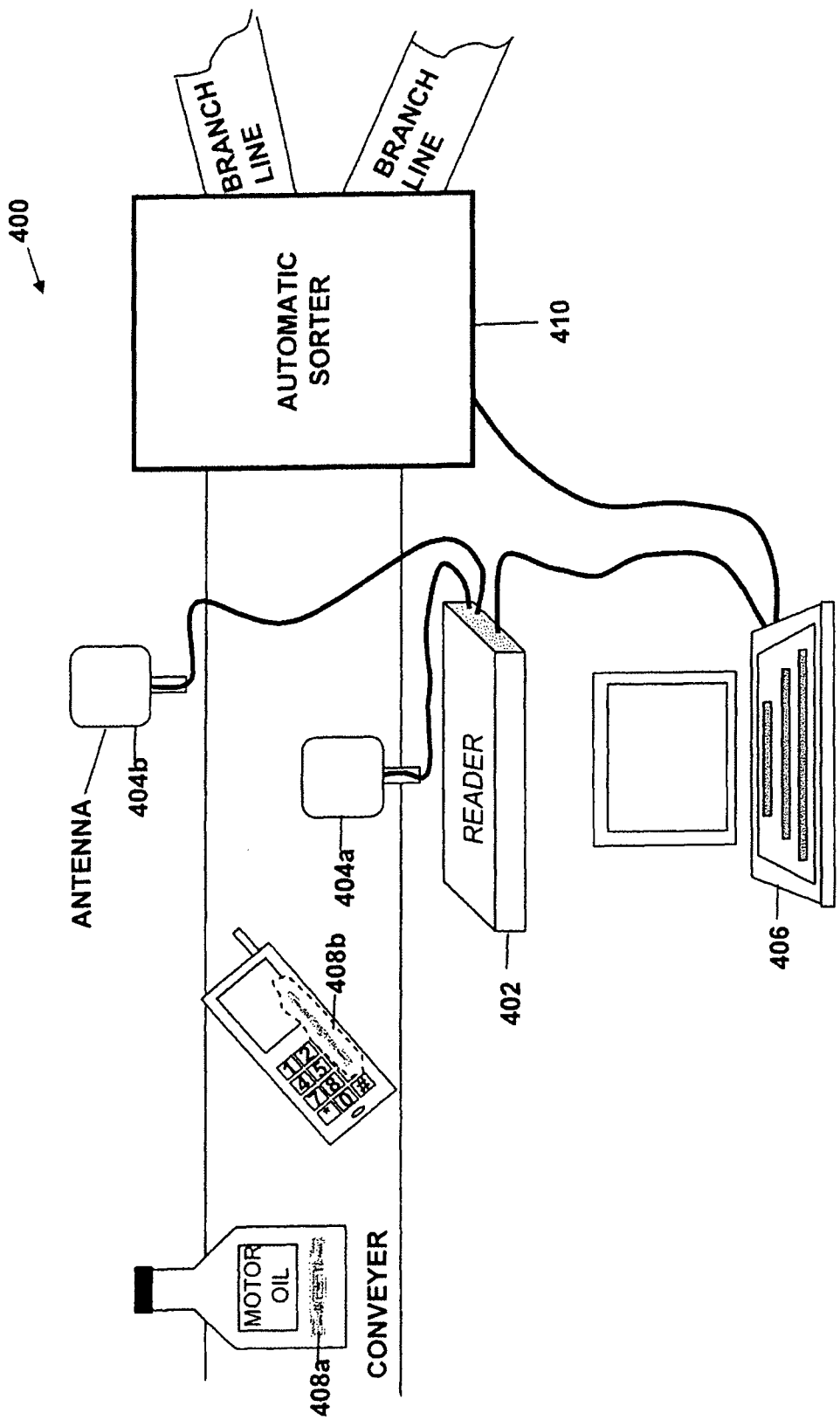
FIG. 4 illustrates an exemplary recycling system according to an embodiment of the present invention.

FIG. 4 illustrates an exemplary recycling system 400 according to an embodiment of the present invention. System 400 includes a reader 402 coupled to antennas 404a, 404b and computer 406. Reader 402 can be operating in a bistatic, monostatic, or multistatic mode with the antennas. As illustrated in FIG. 4, tags 408a, 408b are physically coupled to items to be identified. These items are moved along a conveyer and recycle codes read by reader 402. This recycle information is provided to automatic sorter 410. Sorter 410 can segregate items based on their respective recycle information using magnets, sifters, centrifuges, fluid separators, vacuum loaders, or other known techniques to divert items (or a constituent material, gas, liquid, or sludge) to an appropriate branch line, bin, receptacle, compactor, or hopper. Automatic sorting can provide greater efficiency over manual sorting requiring visual inspection of items. It can also reduce or eliminate the need for private consumers to pre-sort their refuse before collection. Although FIG. 4 depicts a distributed system 400, an alternative system can include a reader, antennas, computer, and automatic sorter integrated into a single piece of equipment. In a specific embodiment, system 400 can also include decontamination equipment (e.g., to wash, heat, or sterilize) and containment equipment for hazardous waste. Decontaminants can include alcohol solution, ethylene oxide, water, detergent, hydrogen peroxide, sodium hydroxide, chloramines solutions, hot steam, hot air stream, and the like.

Figure 5:
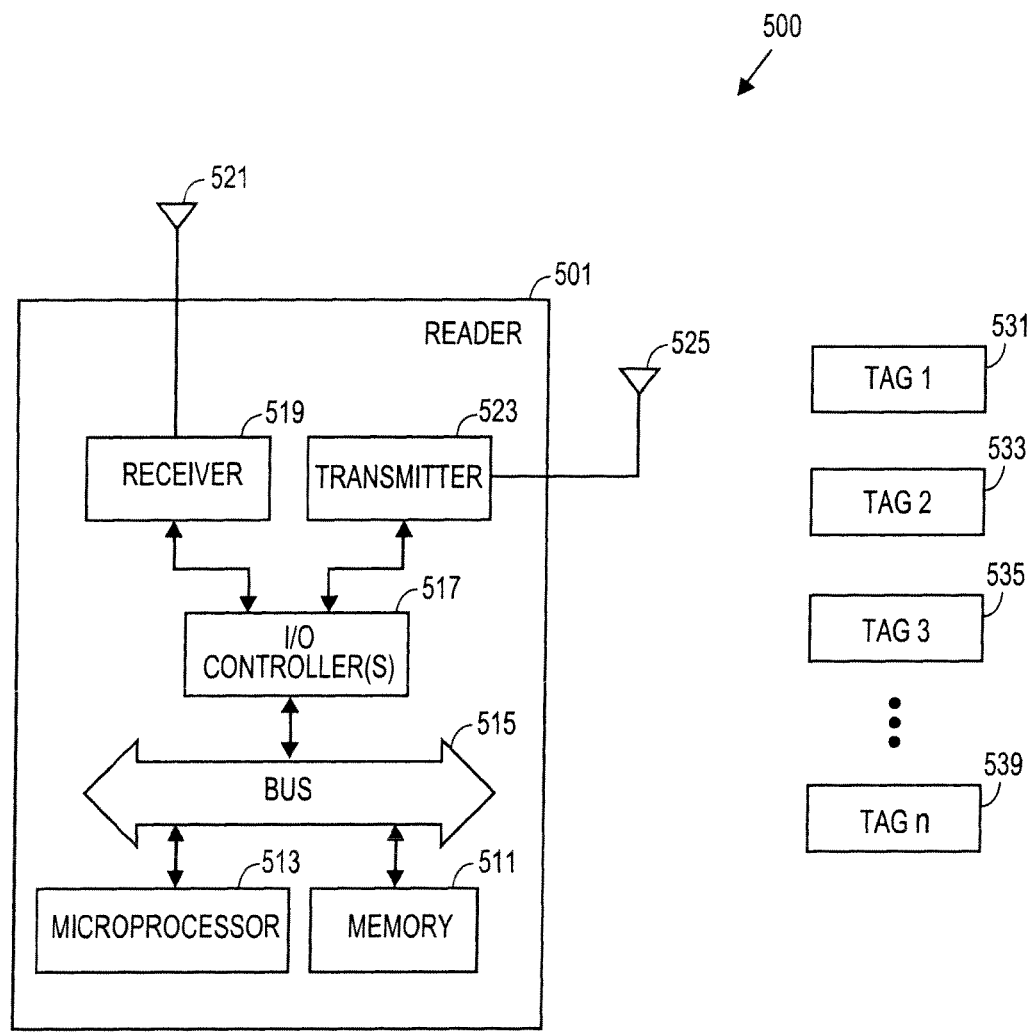
FIG. 5 shows an example of an RFID system according to one embodiment of the present invention. The figure includes a RFID reader and multiple RFID tags.

FIG. 5 illustrates an exemplary radio frequency identification (RFID) system 500, which includes an RFID reader 501 and a plurality of RFID tags 531, 533, 535, . . . , and 539. The system can be either a reader-talks-first or tag-talks-first system using passive, semi-passive, or active tags. Reader 501 typically includes a receiver 519 and a transmitter 523 (alternatively, a transceiver), each of which is coupled to an I/O (input/output) controller 517. The receiver 519 may have its own antenna 521, and the transmitter 523 may have its own antenna 525. It will be appreciated by those in the art that the transmitter 523 and the receiver 519 may share the same antenna provided that there is a receive/transmit switch which controls the signal present on the antenna and which isolates the receiver and transmitter from each other. The receiver 519 and the transmitter 523 may be similar to receiver and transmitter units found in conventional readers. In North America, the receiver and transmitter for RFID typically operate in a frequency range of about 915 megahertz (e.g., 902 MHz-928 MHz) using spread spectrum techniques (e.g., frequency hopping). In Europe, the frequency range is about 866 megahertz (e.g., 865.7 MHz-867.7 MHz). Other regions have set aside, or are in the process of setting aside, frequency ranges for operation—these ranges of operation typically lie somewhere in the overall range of 200 MHz to 5 GHz. Each is coupled to the I/O controller 517 which controls the receipt of data from the receiver and the transmission of data, such as commands, from the transmitter 523. The I/O controller is coupled to a bus 515 which is in turn coupled to a microprocessor 513 and a memory 511.

There are various different possible implementations for the processing system represented by elements 511, 513, 515, and 517, which may be used, for example, in the exemplary RFID reader 501 of FIG. 5. In one embodiment, the microprocessor 513 is a programmable microcontroller, such as an 8051 microcontroller or other well-known microcontrollers or microprocessors (e.g. a PowerPC microprocessor) and the memory 511 includes dynamic random access (DRAM) memory. Memory 511 may also include a non-volatile read only memory for storing data and software programs. The memory 511 typically contains a program which controls the operation of the microprocessor 513 and also contains data used during the processing of tags as in the interrogation of tags. In some embodiments of the present invention, the memory 511 would typically include a computer program which causes the microprocessor 513 to decode received tag data with the appropriate tag-to-reader protocol scheme. The reader 501 may also include a network interface (not shown in figure), such as an Ethernet interface, universal bus interface, or Wi-Fi interface (such as IEEE 802.11, 802.11a, 802.11b, 802.16a, Bluetooth, Proxim's OpenAir, HomeRF, HiperLAN and others), which allows the reader to communicate to other processing systems through a network, including without limitation an inventory management system, central store computer, personal computer, or database server. The network interface would typically be coupled to the bus 515 so that it can receive data, such as the list of tags identified in an interrogation, from either the microprocessor 513 or from the memory 511.

Figure 6:
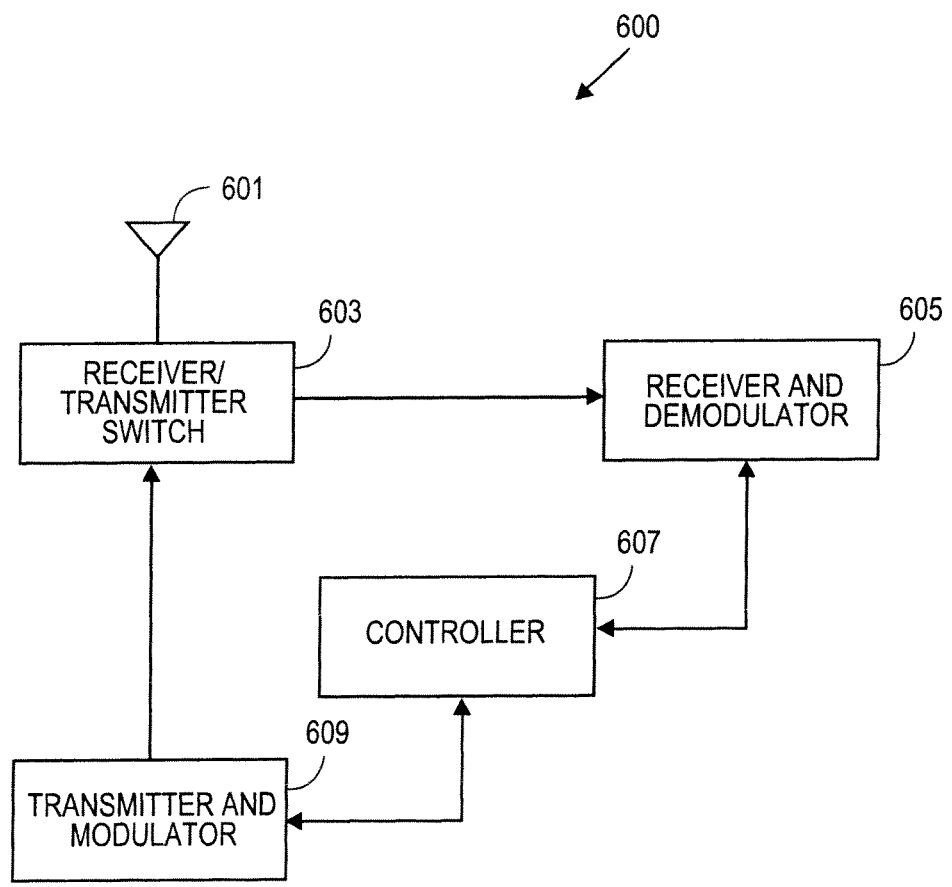
FIG. 6 shows an exemplary embodiment of an RFID tag according to an embodiment of the present invention. The exemplary tag includes an antenna, receiver/transmitter, and a controller, among other things.

FIG. 6. shows an example of one implementation of a radio frequency identification (RFID) tag which may be used with the present invention. The tag 600 includes an antenna 601 (alternatively, two, three or more antennas) which is coupled to a receive/transmit switch 603. This switch is coupled to the receiver and demodulator 605 and to the transmitter and modulator 609. A controller unit 607 is also coupled to the receiver/demodulator 605 and to the transmitter/modulator 609. The particular exemplary RFID tag shown in FIG. 6 may be used in various embodiments of the present invention in which data is maintained in a memory (not shown in figure). The receiver and demodulator 605 receives signals through the antenna 601, e.g., interrogation signals from a reader (not shown in figure), and the switch 603 and demodulates the signals and provides these signals to the controller unit 607. Commands received by the receiver 605 are passed to the controller of the unit 607 in order to control the operation of the tag. Any additional data received by the receiver 605 is also passed to the control unit 607, and this data may include handshaking data (e.g., parameters for a tag-to-reader encoding protocol). The transmitter and modulator 609, under control of the control unit 607, transmits responses to the commands or other processed data through the switch 603 and the antenna 601 to the reader. It will be appreciated by those skilled in the art that the transmitter may be merely a switch or other device which modulates reflections from an antenna, such as antenna 601.

Figure 7:
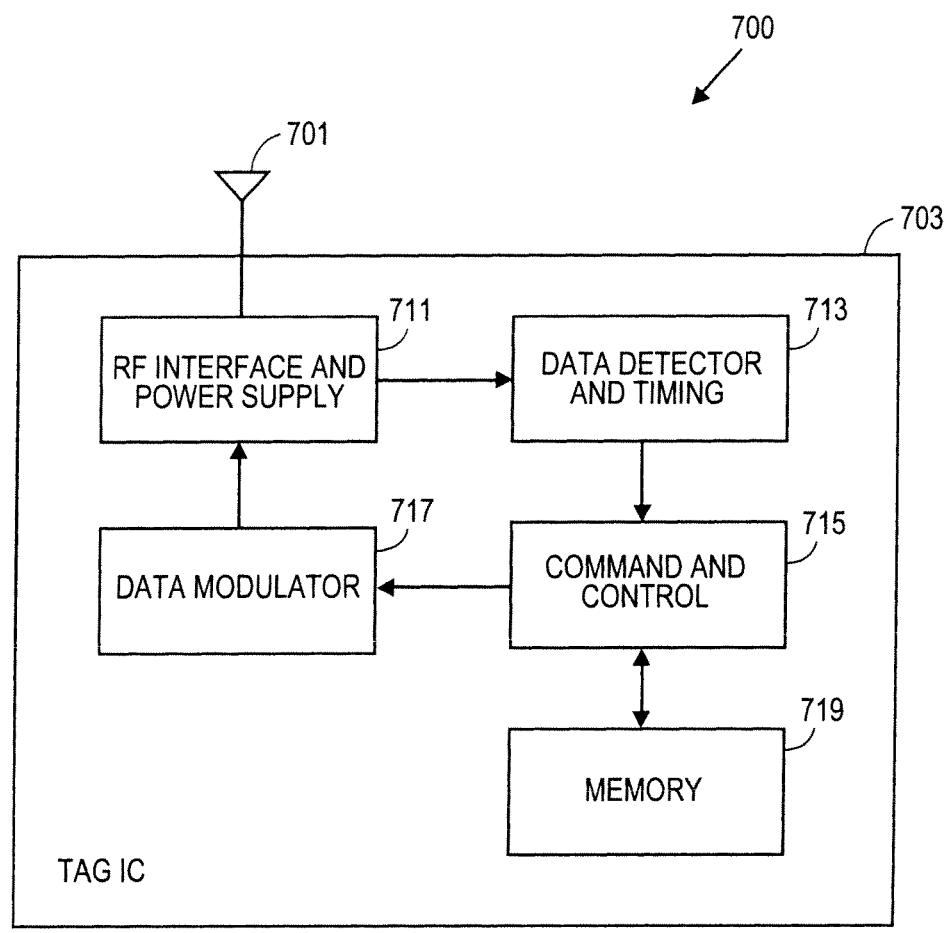
FIG. 7 shows an example of an RFID tag according to another embodiment of the present invention. In particular, it illustrates an exemplary embodiment of a controller typically found in an RFID tag.

In certain embodiments of the present invention, RFID tags may be designed with a small integrated circuit (IC) area, a small memory, atomic transactions to minimize tag state storage requirements, and the like. This type of design will lower the tag production cost, thereby enabling wide-scale adoption of RFID labeling in a variety of industries, for example, in the supply chain. FIG. 7 shows an example of a low cost tag 700. The tag 700 includes an antenna 701 and an integrated circuit (IC) 703, coupled together. Tag IC 703 implements the command protocol and contains data such as an EPC. The antenna 701 receives the reader-generated interrogation signals and reflects the interrogation signal back to the reader in response to a modulation signal created by the tag IC 703. The exemplary tag IC 703 comprises a radio frequency (RF) interface and power supply 711, data detector and timing circuit 713, command and control 715, data modulator 717, and memory 719. In one embodiment, command and control 715 may include static logic (such as a state machine) which implements communication protocols according to various embodiments of the present invention.

The RF interface and power supply 711 converts the RF energy into the DC power required for the tag IC 703 to operate and provides modulation information to the data detector and timing circuit 713. The RF interface also provides a means of coupling the tag modulation signals to the antenna for transmission to the reader. The data detector and timing circuit 713 demodulates the reader signals and may generate timing and data signals used by the command and control 715, including a subcarrier sequence. The command and control 715 coordinates all of the functions of the tag IC 703. The command and control 715 may include state logic to interpret data from the reader, perform the required internal operations, and determine if and/or how the tag will respond to the reader. The memory 719 contains the EPC, which may be associated with the tagged item. The data modulator 717 translates the binary tag data into a tag-to-reader encoded signal that is then applied to the RF interface 711 and transmitted to the reader (e.g., reader 501 of FIG. 5). In one embodiment, IC 703 is a NanoBlock™ IC made by Alien Technology Corporation of Morgan Hill, Calif.

The design and implementation of RFID tags can be characterized in terms of layers. For example, a physical and environmental layer characterizes the mechanical, environmental, reliability and manufacturing aspects of a tag, an RF transport layer characterizes RF coupling between reader and tag, and a communication layer characterizes communications/data protocols between readers and tags. Various different implementations of tags at different layers can be used with embodiments of the present invention. It is understood that the implementations of the tags are not limited to the examples shown in this description. Different tags or communication devices can use methods and apparatuses of the embodiments of the present invention for communication according to the needs of the particular application.

In one embodiment of the present invention, a tag may be fabricated through a fluidic self-assembly process. For example, an integrated circuit (e.g., 703 of FIG. 7) may be fabricated with a plurality of other integrated circuits in a semiconductor wafer. The integrated circuit will include, if possible, all the necessary logic of a particular tag, possibly excluding the antenna 701. Thus, all the logic shown in the tag 700 would be included on a single integrated circuit and fabricated with similar integrated circuits on a single semiconductor wafer. Each circuit may be programmed (or pre-programmed) with a unique identification code and then singulated (and shaped) from the wafer. Integrated circuit block can be singulated by many techniques, including those described in U.S. patent No. application Ser. No. 11/546,683 filed on Oct. 11, 2006, entitled "Block Formation Process", which is incorporated by referenced. Integrated circuit blocks are next suspended in a fluid. The fluid is then dispersed over a substrate, such as a flexible substrate, to create separate tags. Receptor regions in the substrate would receive at least one integrated circuit, which then can be connected with an antenna on the substrate to form a tag. An example of fluidic self-assembly (FSA) is described in U.S. Pat. No. 6,864,570, entitled "Method for Fabricating Self-Assembling Microstructures," which is incorporated by reference herein.

Alternatively, other conventional or unconventional assembly methods may be used to construct the radio frequency tag. Silicon integrated circuits, formed using standard CMOS processes can be bonded to an antenna using robotic techniques (e.g., pick and place methods, surface mounted flip chips, and the like), vibratory assembly techniques, or a wire bonding construction. The chip can be placed in a carrier, such as a lead frame or a strap, or be bonded directly to an antenna. Strap attachment may be accomplished in automatic web processes using Alien Technology Corporation's high speed strap attach machine (HiSAM™ machine). The chip need not be made of silicon—devices built from semiconductors such as GaAs, or even organic semiconductors, can achieve the benefits derived from these communication methods.

In the foregoing specification, the invention has been described with reference to specific exemplary embodiments thereof. It will be evident that various modifications may be made thereto without departing from the broader spirit and scope of the invention as set forth in the following claims. For example, the invention has been described in detail for reader-talk-first systems, but the invention can be applied to tag-talk-first systems. The specification and drawings are, accordingly, to be regarded in an illustrative sense rather than a restrictive sense.

What is claimed is:

1. A passive RFID tag comprising:
    at least one antenna;
    a first memory location storing a first identifier;
    a second memory location storing a second identifier, the tag being configured to receive a first identification query, the tag being configured to respond to the first identification query with the first identifier, the tag being configured to receive a reveal code and to compare the reveal code to a predetermined code to determine whether the reveal code is valid; and
    the tag being configured to receive a second identification query and to respond to the second identification query with the second identifier, if the reveal code is valid, wherein the reveal code includes a command instructing the tag to respond to the second identification query with the second identifier that comprises more information about an item associated with the tag than the first identifier, wherein the second identification query is received at a time that is later than a time of the first identification query, wherein access to the first identifier is permanently disabled after receipt of the reveal code and wherein the at least one antenna and the first memory location and the second memory location are coupled to a controller in the RFID tag.

2. The RFID tag of claim 1 wherein the tag overwrites the first identifier in the first memory location with the second identifier after receipt of the reveal code.

3. The RFID tag of claim 1 wherein the reveal code is algorithmically calculated from both a predefined sequence and a random sequence.

4. The RFID tag of claim 3 wherein
    (a) the predefined sequence is a pass-code number, and
    (b) the random sequence is a handle transmitted to a reader from the tag.

5. The RFID tag of claim 1 wherein the reveal code is predefined sequence.

6. The RFID tag of claim 1 wherein the reveal code is a random sequence.

7. The RFID tag of claim 1 wherein, the tag is configured to return an error code upon receipt of an invalid reveal code and wherein the reveal code is a recycle code.

8. The RFID tag of claim 1 wherein the reveal code is determined by a Boolean operation.

9. The RFID tag of claim 1 wherein the reveal code includes a first code before the tag transmits a handle and a second code after the tag transmits the handle.

10. The RFID tag of claim 1 wherein the first identification query is received from a frequency-hopping reader.

11. The RFID tag of claim 1 wherein the first identifier is an electronic product code, and the second identifier includes recycle information for the item associated with the tag.

12. The RFID tag of claim 11 wherein the recycle information provides at least one of a constituent material of the item, a disposal regulation for the item, a center accepting the item for disposal.

13. The RFID tag of claim 1 wherein the first identifier and second identifier are product codes, and the second identifier being more specific than the first identifier for the item associated with the tag.

14. An RFID tag comprising:
    at least one antenna;
    a first memory location storing a first identifier;
    a second memory location storing a second identifier, the tag being configured to receive a first identification query, the tag being configured to respond to the first identification query with the first identifier, the tag being configured to receive a reveal code and to compare the reveal code to a predetermined code to determine whether the reveal code is valid; and the tag being configured to receive a second identification query and to permanently respond to the second identification query with the second identifier, if the reveal code is valid, wherein the reveal code includes a command instructing the tag to respond to the second identification query with the second identifier that comprises more information about an item associated with the tag than the first identifier, wherein the second identification query is received at a time that is later than a time of the first identification query, wherein access to the first identifier is permanently disabled after receipt of the reveal code and wherein the at least one antenna and the first memory location and the second memory location are coupled to a controller in the RFID tag.

15. An RFID tag comprising:
at least one antenna;
a first memory location storing a first identifier that is a product code;
a second memory location storing a second identifier that is a recycling identifier, the tag being configured to receive a first identification query, the tag being configured to respond to the first identification query with the first identifier, the tag being configured to receive a recycle code and to compare the recycle code to a predetermined code to determine whether the recycle code is valid; and
the tag being configured to receive a second identification query and to respond to the second identification query with the recycling identifier for an item associated with the tag, if the recycle code is valid,
wherein the recycle code includes a command instructing the tag to respond to the second identification query with the recycling identifier, wherein the second identification query is received at a time that is later than a time of the first identification query, wherein access to the first identifier is permanently disabled after receipt of the recycle code and wherein the at least one antenna and the first memory location and the second memory location are coupled to a controller in the RFID tag.

16. The RFID tag of claim 15 wherein the recycle code is calculated by a Boolean operation of at least two values.

17. A method of operating an RFID reader comprising:
transmitting a first identification query to a tag comprising at least one antenna;
receiving, in response to the first identification query, a first identifier stored in a first memory location of the tag;
transmitting a reveal code to the tag;
receiving an indication that the reveal code is valid from the tag;
transmitting a second identification query after transmitting the reveal code; and
if the reveal code is valid, receiving, in response to the second identification query, a second identifier stored in a second memory location of the tag, wherein the reveal code includes a command instructing the tag to respond to the second identification query with the second identifier that comprises more information about an item associated with the tag than the first identifier, wherein the second identification query is transmitted at a time that is later than a time of the first identification query, wherein access to the first identifier is permanently disabled after receipt of the reveal code and wherein the at least one antenna and the first memory location and the second memory location are coupled to a controller in the tag.

18. The method of claim 17 wherein the first identifier and second identifier are product codes.

19. The method of claim 17 wherein the first identifier is an electronic product code, and the second identifier includes recycle information for the item associated with the tag.

20. The method of claim 17 wherein the reader communicates the second identifier to an automatic recycling separator and wherein the reveal code is a recycle code.

21. A method of operating an RFID system comprising:
transmitting a first identification query;
receiving, in response to the first identification query, a first predefined identifier for use;
receiving an instruction from a computing system to transmit a reveal code;
transmitting the reveal code to a tag, the tag comprising at least one antenna;
receiving an indication that the reveal code is valid from the tag;
transmitting a second identification query; and
if the reveal code is valid, receiving, in response to the second identification query, a second predefined identifier, wherein the first predefined identifier is stored in a first memory location of the tag and the second predefined identifier is stored in a second memory location of the tag, wherein the reveal code includes a command instructing the tag to respond to the second identification query with the second predetermined identifier that comprises more information about an item associated with the tag than the first predefined identifier, wherein the second identification query is transmitted at a time that is later than a time of the first identification query, wherein access to the first predefined identifier is permanently disabled after receipt of the reveal code and wherein the at least one antenna and the first memory location and the second memory location are coupled to a controller in the tag.

22. The method of claim 21 wherein the computing system is an inventory management system for at least one of a retail store, warehouse, pharmacy, and recycling center.

23. A method for operating a tag, the method comprising:
receiving a first interrogating RF signal, the first interrogating RF signal providing power to the tag, the first interrogating RF signal comprising a first identification query;
transmitting, via at least one antenna, a first identifier in response to the first identification query, the first identifier being stored in a first memory location;
receiving a reveal code from an interrogator;
comparing the reveal code from the interrogator to a predetermined code to determine if the reveal code is valid;
receiving a second identification query;
if the reveal code is valid, transmitting a second identifier in response to the second identification query, the second identifier being stored in a second memory location, and
if the reveal code is not valid, (i) creating a timeout interval preventing further attempts of comparing and (ii) transmitting the first identifier in response to the second identification query, wherein the reveal code includes a command instructing the tag to respond to the second identification query with the second identifier that comprises more information about an item associated with the tag than the first identifier, wherein the second identification query is received at a time that is later than a time of the first identification query, wherein access to the first identifier is permanently disabled after receipt of the reveal code, and wherein the at least one antenna and the first memory location and the second memory location are coupled to a controller in the tag.

24. The method of claim 23 wherein the interrogator frequency hops in a pseudorandom sequence within a predefined frequency spectrum.

25. A passive RFID tag comprising:
at least one antenna;
a first memory location storing a first identifier;
a second memory location storing a second identifier, the tag being configured to receive a first identification query, the tag being configured to respond to the first identification query with the first identifier, the tag being configured to receive a first code and to compare the first code to a predetermined code to determine whether the first code is valid, wherein the tag is configured to receive a second identification query; and
the tag being configured to disable access to the first memory location storing the first identifier and to respond to the second identification query with the second identifier that identifies an item associated with the tag differently than the first identifier, if the first code is valid, wherein the first code includes a command instructing the tag to respond to the second identification query with the second identifier that comprises more information about an item associated with the tag than the first identifier, wherein the second identification query is received at a time that is later than a time of the first identification query, wherein access to the first identifier is permanently disabled after receipt of the first code and wherein the at least one antenna and the first memory location and the second memory location are coupled to a controller in the RFID tag.

26. The RFID tag of claim 25 wherein the tag overwrites the first identifier in the first memory location with the second identifier after receipt of the first code.

27. The RFID tag of claim 25 wherein the first code is algorithmically calculated from both a predefined sequence and a random sequence.

28. The RFID tag of claim 27 wherein
(a) the predefined sequence is a pass-code number, and
(b) the random sequence is a handle transmitted to a reader from the tag.

29. The RFID tag of claim 25 wherein the first identifier is a product code and the second identifier provides less information than the product code.

30. The RFID tag of claim 29 wherein the second identifier is a recycle code.

31. An RFID reader comprising:
an RF (radiofrequency) receiver;
an RF transmitter;
a processor coupled to the RF receiver and to the RF transmitter, the processor configured to transmit a first identification query to a tag comprising at least one antenna, and to receive, in response to the first identification query, a first identifier that is stored in a first memory location of the tag and configured to transmit a first code to the tag, to receive an indication that the first code is valid, and to transmit a second identification query, after transmitting the first code, and configured to receive, in response to the second identification query a second identifier that is stored in a second memory location of the tag, wherein the second identifier that identifies a product associated with the tag differently than the first identifier is received, if the first code is valid, and wherein the first code includes a command instructing the tag to respond to the second identification query with the second identifier that comprises more information about an item associated with the tag than the first identifier, wherein the second identification query is transmitted at a time that is later than a time of the first identification query, wherein access to the first identifier is permanently disabled after receipt of the first code and wherein the at least one antenna and the first memory location and the second memory location are coupled to a controller in the tag.

32. The RFID reader of claim 31, wherein the first identification query and the second identification query are the same query command.

33. The RFID reader of claim 31 wherein the first code is one of
(a) a reveal code;
(b) a conceal code; or
(c) a recycle code.

34. The RFID reader of claim 31 wherein the first identifier is a product code and the second identifier is a recycle code.

* * * * *